United States Patent
Arita et al.

(10) Patent No.: US 8,132,533 B2
(45) Date of Patent: Mar. 13, 2012

(54) OVERFLOW DEVICE FOR WATER TANK

(75) Inventors: Ryuzo Arita, Sakura (JP); Kazutoshi Tominaga, Higashiosaka (JP)

(73) Assignee: Kabushiki Kaisha Tominaga Jyushi Kogyosho, Higashiosaka-shi, Osaka (JP)

( * ) Notice: Subject to any disclaimer, the term of this patent is extended or adjusted under 35 U.S.C. 154(b) by 545 days.

(21) Appl. No.: 12/225,401

(22) PCT Filed: Sep. 30, 2006

(86) PCT No.: PCT/JP2006/317084
§ 371 (c)(1),
(2), (4) Date: Apr. 21, 2009

(87) PCT Pub. No.: WO2007/108146
PCT Pub. Date: Sep. 27, 2007

(65) Prior Publication Data
US 2010/0236489 A1    Sep. 23, 2010

(30) Foreign Application Priority Data

Mar. 22, 2006 (JP) .................. 2006-079517

(51) Int. Cl.
*A01K 63/04* (2006.01)
(52) U.S. Cl. .......... 119/259; 135/143; 135/147
(58) Field of Classification Search .......... 119/259–262, 119/245, 248; 137/140, 142–144, 147; 210/416.2, 210/167.21
See application file for complete search history.

(56) References Cited

U.S. PATENT DOCUMENTS

| 2,225,498 | A |   | 12/1940 | Hollander |
| 3,485,373 | A | * | 12/1969 | Powers ..................... 210/167.27 |
| 4,035,299 | A | * | 7/1977 | Vroeginday ............. 210/167.27 |
| 4,036,756 | A | * | 7/1977 | Dockery ................... 210/167.27 |
| 4,684,462 | A | * | 8/1987 | Augustyniak .................... 210/97 |
| 4,861,465 | A |   | 8/1989 | Augustyniak |
| 4,988,436 | A | * | 1/1991 | Cole ......................... 210/167.22 |
| 5,965,016 | A | * | 10/1999 | Suchowski et al. ...... 210/167.22 |
| 6,056,886 | A | * | 5/2000 | Hickok et al. ................ 210/776 |
| 2006/0060150 | A1 | * | 3/2006 | Green ........................... 119/245 |

FOREIGN PATENT DOCUMENTS

| JP | 3-018619 | 9/1995 |
| JP | 3-022824 | 1/1996 |

OTHER PUBLICATIONS

European Search Report dated Feb. 1, 2010.
International Search Report.

* cited by examiner

*Primary Examiner* — Kristen Hayes
(74) *Attorney, Agent, or Firm* — Collard & Roe, P.C.

(57) ABSTRACT

An aquarium overflow device capable of preventing adverse effects by suction noise of an overflow pipe. The aquarium overflow device according to the present invention is equipped with a water storing portion 52 for storing water W in an aquarium, an overflow pipe 54 extended upwardly in the water storing portion 52 and having an upper end opening for introducing the water W stored in the water storing portion 52 and a lower end opening for discharging the water which is open to a bottom wall side of the water storing portion 52, and a sound preventing cover 47 provided in the water storing portion 52 so as to cover the entire region of the above-water portion of the overflow pipe 54.

4 Claims, 12 Drawing Sheets

OVERFLOW DEVICE FOR WATER TANK

CROSS REFERENCE TO RELATED APPLICATIONS

This application is the National Stage of PCT/JP2006/317084 filed on Aug. 30, 2006, which claims priority under 35 U.S.C. §119 of Japanese Application No. JP 2006-079517 filed on Mar. 22, 2006. The international application under PCT article 21(2) was not published in English.

TECHNICAL FIELD

The present invention relates to an overflow device for supplying water in an aquarium for ornamental fish, etc., to an external equipment, such as, e.g., a filtering device.

BACKGROUND ART

When keeping ornamental fish, e.g., saltwater fish or freshwater fish, in an aquarium, a filtering device is usually installed for the purpose of keeping the water in the aquarium clean.

As an aquarium filtering device, an underwater installation type filtering device designed to be installed within an aquarium and an outside installation type filtering device designed to be installed outside an aquarium are well known. As compared with the underwater installation type filtering device, the outside installation type filtering device is suitable in terms of enlarging the size and can have excellent filtration capacity.

Conventionally, for the purpose of supplying the water in the aquarium to an outside installation type filtering device or returning the water in the filtering device to the aquarium, an overflow device is used.

As disclosed in the following Patent Document 1, a conventional overflow device includes, for example, a tank-outside water storing portion to be disposed on the side wall outside surface of an aquarium, and a reverse U-shaped siphon pipe to be disposed so as to straddle the aquarium inside and the aquarium outside, and an overflow pipe provided in the tank-outside water storing portion. It is configured such that the water in the aquarium is supplied to the tank-outside water storing portion via the siphon pipe and flows out via the overflow pipe to be supplied to a filtering device disposed outside the aquarium.

The filtering device disposed outside the aquarium is provided with a discharge pump so that the water filtered by the filtering device is forcibly discharged (returned) by the discharge pump to the aquarium via an outlet pipe.

Patent Document 1: Japanese Utility Model Registration No. 3018619 (FIG. 3)

DISCLOSURE OF THE INVENTION

Problems to be Solved by the Invention

In a conventional aquarium overflow device disclosed in the abovementioned Patent Document 1, even in cases where the discharge pump of the filtering device stops and therefore the returning of the water in the aquarium to the aquarium is interrupted, the water in the aquarium will be continuously supplied to the filtering device via the siphon pipe unless the water level of the aquarium drops lower than the inlet side end portion of the siphon pipe. This causes excessive water supply to the filtering device, which in turn may cause a water level exceeding an allowable water level or even the water overflow.

The present invention was made in view of the aforementioned conventional technique, and aims to provide an aquarium overflow device capable of preventing water in the aquarium from being supplied to an outside immediately after the drop of the water level of the aquarium.

Means to Solve the Problems

In order to attain the aforementioned objects, the present invention has the following structure.

[1] An aquarium overflow device for supplying water in an aquarium to an external device, the overflow device comprising:

an inverted U-shaped siphon pipe for supplying the water in the aquarium to an outside of the aquarium, the siphon pipe having an inlet side end portion to be disposed in the aquarium and an outlet side end portion to be disposed outside the aquarium, wherein the siphon pipe has an air inlet portion formed at an inlet side pipe portion of the siphon pipe so as to be located above the inlet side end portion, whereby, when a water level in the aquarium drops below the air inlet portion, air is introduced into the siphon pipe via the air inlet portion to thereby prevent water from being suctioned into the siphon pipe.

[2] The aquarium overflow device as recited in Item 1, wherein the air inlet portion is formed by cutting out the inlet side portion of the siphon pipe.

[3] The aquarium overflow device as recited in Item 1 or 2, further comprising a tank-outside water storing portion to be disposed along a side wall external surface of the aquarium, wherein the outlet side end portion of the siphon pipe is disposed in the tank-outside water storing portion so that the water in the aquarium is once stored in the tank-outside water storing portion and then supplied to an outside of the aquarium.

[4] The aquarium overflow device as recited in any one of Items 1 to 3, further comprising a tank-inside water storing portion which is to be disposed along a side wall inner surface of the aquarium and configured to introduce the water in the aquarium therein, wherein the inlet side end portion of the siphon pipe is disposed in the tank-inside water storing portion.

[5] The aquarium overflow device as recited in any one of Items 1 to 4, further comprising an inverted U-shaped discharge pipe having an inlet side end portion to be disposed outside the aquarium and an outlet side end portion to be disposed inside the aquarium, wherein water forcibly supplied from an external device is introduced into the discharge pipe from the inlet side end portion and then discharged to the aquarium from the outlet side end portion, wherein the discharge pipe is provided with a backflow preventing hole at an upper portion thereof, and wherein, when forcible water supply from the external device is stopped, air is introduced into the discharge pipe from the backflow preventing hole to thereby prevent backflow of the water.

Effects of the Invention

According to the aquarium overflow device of the invention [1], when the water lever of the aquarium drops in the case of emergency, e.g., when the pump stops, air will be introduced into the siphon pipe from the air inlet portion. This prevents suction of water into the siphon pipe, which automatically stops the water supply without delay.

According to the aquarium overflow device of the invention [2], since the air inlet portion is formed into a cutout shape, when the water lever drops to the height of the air inlet portion, air will be introduced into the siphon pipe more assuredly. This in turn can stop the water supply more assuredly.

According to the aquarium overflow device of the invention [3] and [4], since the water in the aquarium is suctioned via the tank-inside water storing portion or supplied to an outside of the aquarium via the tank-outside water storing portion, it is possible to stably supply the water in the aquarium to an outside of the aquarium.

According to the aquarium overflow device of the invention [5], even if unexpected situations, e.g., pump stop, occur when water is being discharged from an external device to the aquarium by the discharge pump, air will be introduced into the discharge pipe from the backflow preventing hole. This prevents the suction of water into the discharge pipe, which in turn can prevent problems, such as, the backflow of the water in the aquarium through the discharge pipe.

DESCRIPTION OF REFERENCE NUMERALS

Figure 1:
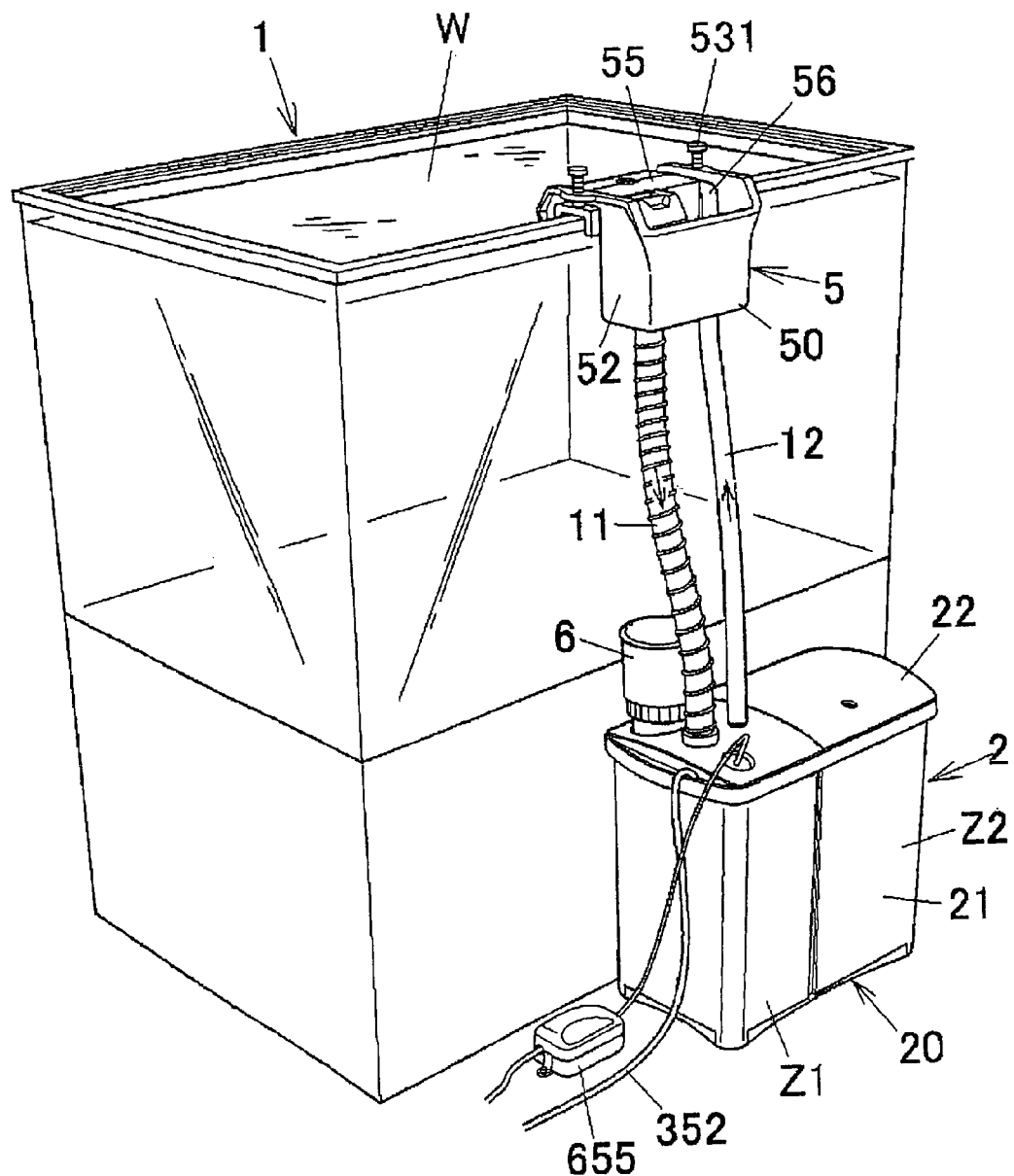
FIG. 1 is a perspective view showing an aquarium system according to an embodiment of the present invention.
Figure 2:
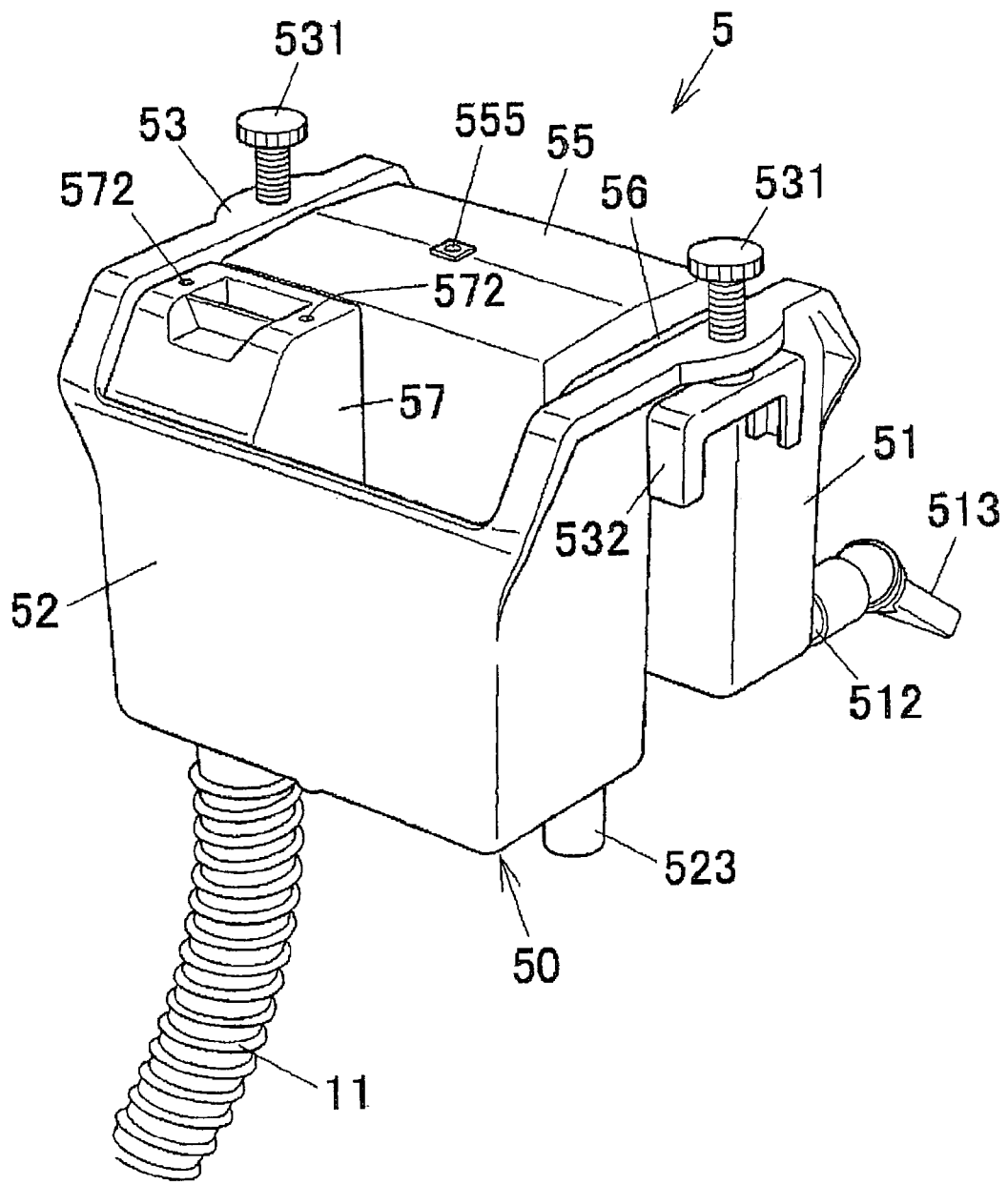
FIG. 2 is a perspective view showing an overflow device applied to the aquarium system of the embodiment.

1 . . . aquarium
2 . . . filtering device (external device)
5 . . . overflow device
51 . . . tank-inside water storing portion
52 . . . tank-outside water storing portion
55 . . . siphon pipe
551 . . . high level inlet portion (air inlet portion)
56 . . . discharge pipe
561 . . . backflow preventing hole
W . . . water

BEST MODE FOR CARRYING OUT THE INVENTION

FIG. 1 is a perspective view showing an aquarium system according to an embodiment of the present invention. As shown in the figure, the aquarium system includes, as fundamental structural elements, an aquarium 1, an independent installation type filtering device 2 which is to be installed independently from the aquarium 1, an overflow device 5 for discharging water W from and introducing water W to the aquarium 1, an inlet hose 11, such as, e.g., an inlet pipe, for supplying water from the overflow device 5 to the filtering device 2, and an outlet hose 12, such as, e.g., an outlet pipe, for sending water from the filtering device 2 to the overflow device 5.

<Overflow Device>

As shown in FIGS. 1 to 4, the overflow device 5 is equipped with an overflow box 50 to be straddled on the side wall upper end of the aquarium 1. In the overflow box 50, a siphon pipe 55, a discharge pipe 56, and a sound insulating cover 57 are mounted.

The overflow box 50 is constituted by an integrally formed resin molded article including a box-shaped tank-inside water storage portion 51 having an open upper end and configured to be disposed along a side wall inner surface of the aquarium 1, a box-shaped tank-outside water storage portion 52 having an open upper end and configured to be disposed along a sidewall outer surface of the aquarium 1, and a bridge connection portion 53 bridging upper end portions of both the water storage portions 51 and 52 and connecting both the water storage portions 51 and 52.

One side wall portion of the tank-inside water storage portion 51 has a number of vertically extended slit-like water passage holes 511 arranged in parallel in the horizontal direction at certain intervals, so that the water W in the aquarium flows into the tank-inside water storage portion 51 via the water passage holes 511.

The one side wall portion of the tank-inside water storage portion 51 is, at the lower end edge portion thereof, provided with a discharge opening 512 to which a discharge nozzle 513 is connected.

A siphon pipe 55 is constituted by an inverted generally U-shaped wide-width tubular member and configured so that the inlet side end portion is placed in the tank-inside water storage portion 51, the intermediate bent portion is placed on the bridge connection portion 53, and the outlet side end portion is placed in the tank-outside water storage portion 52. Thus, in the state in which the siphon pipe 55 is filled with water W, if the water level at the side of the tank-inside water storage portion 51 is higher than the water level at the side of the tank-outside water storage portion 52, the water W in the tank-inside water storage portion 51 is fed to the side of the tank-outside water storage portion 52 via the siphon pipe 55 due to the difference in atmospheric pressure.

Figure 3:
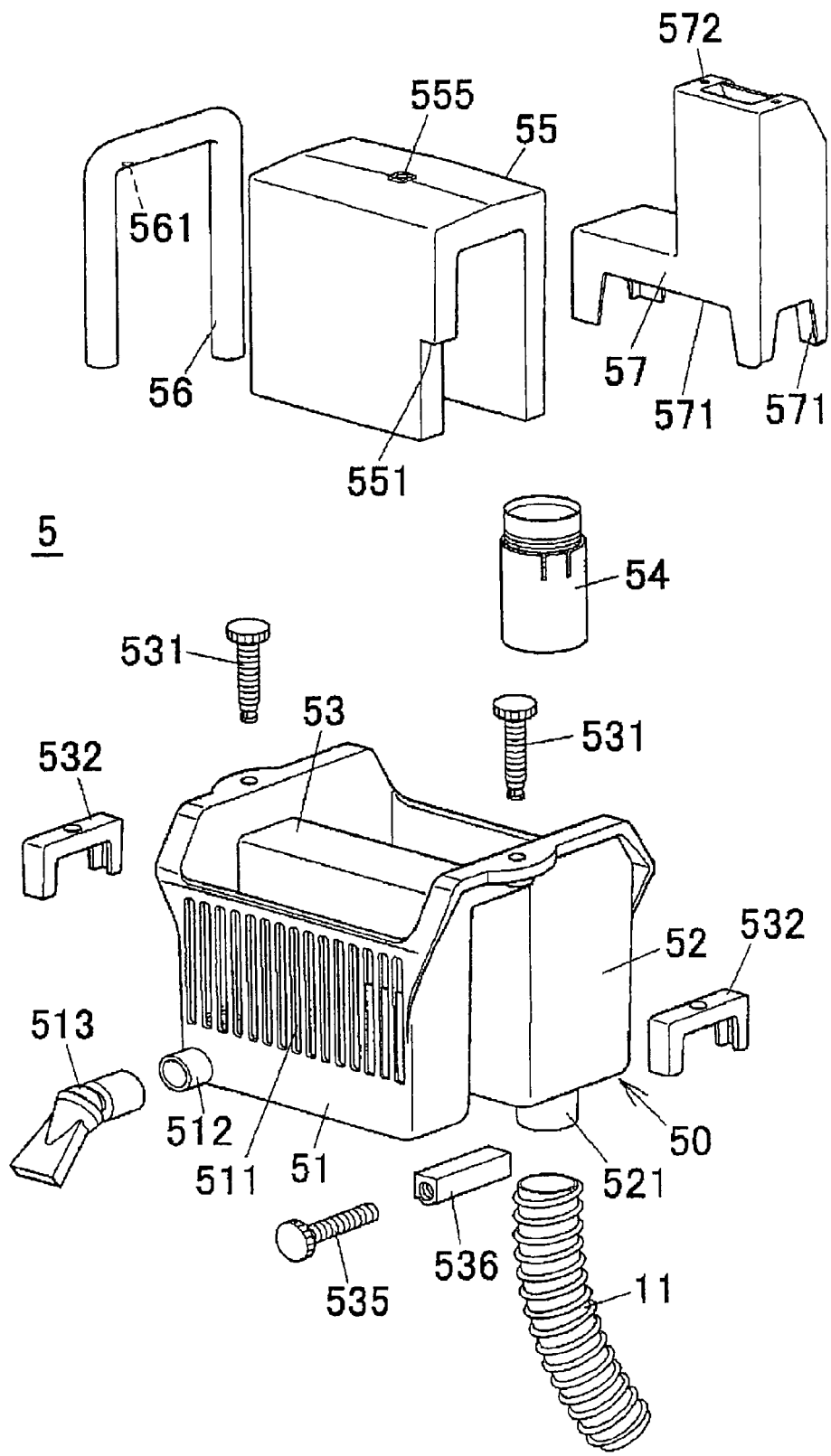
FIG. 3 is an exploded perspective view of the overflow device of the embodiment.
Figure 4:
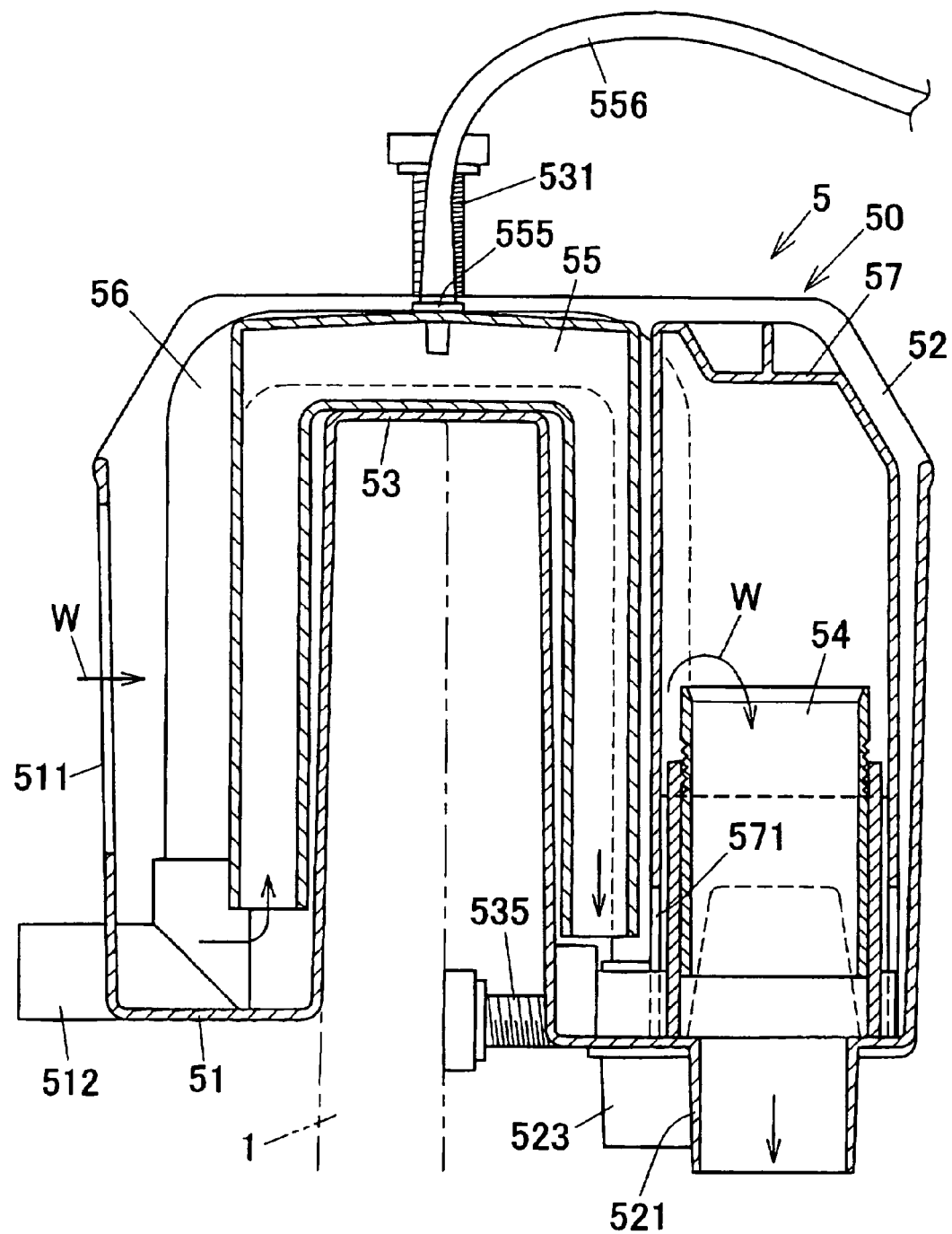
FIG. 4 is a side cross-sectional view of the overflow device of the embodiment.
Figure 5:
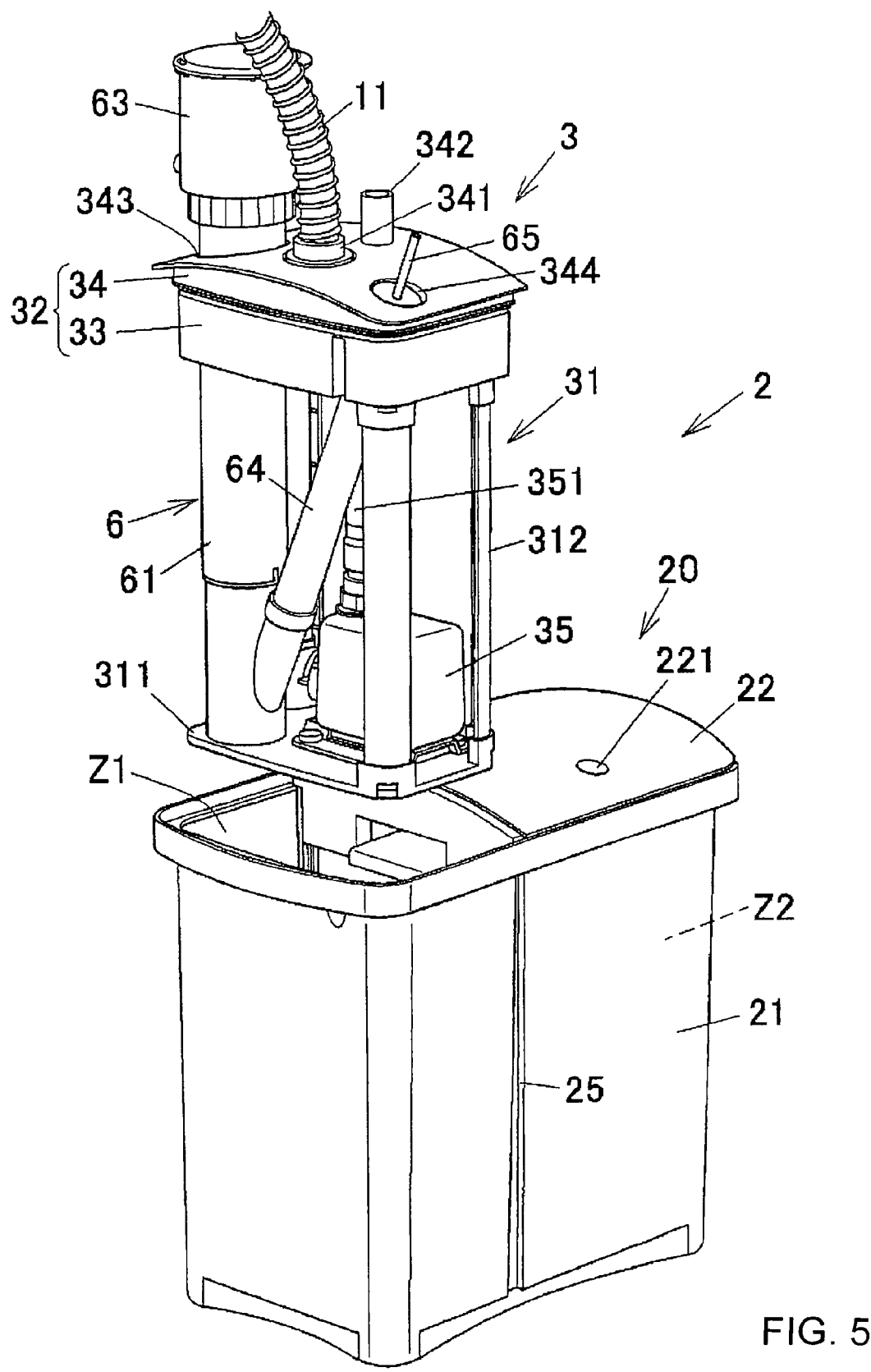
FIG. 5 is a perspective view of the filtering device applied to the aquarium system of the embodiment in which the functional component unit is pulled put.
Figure 6:
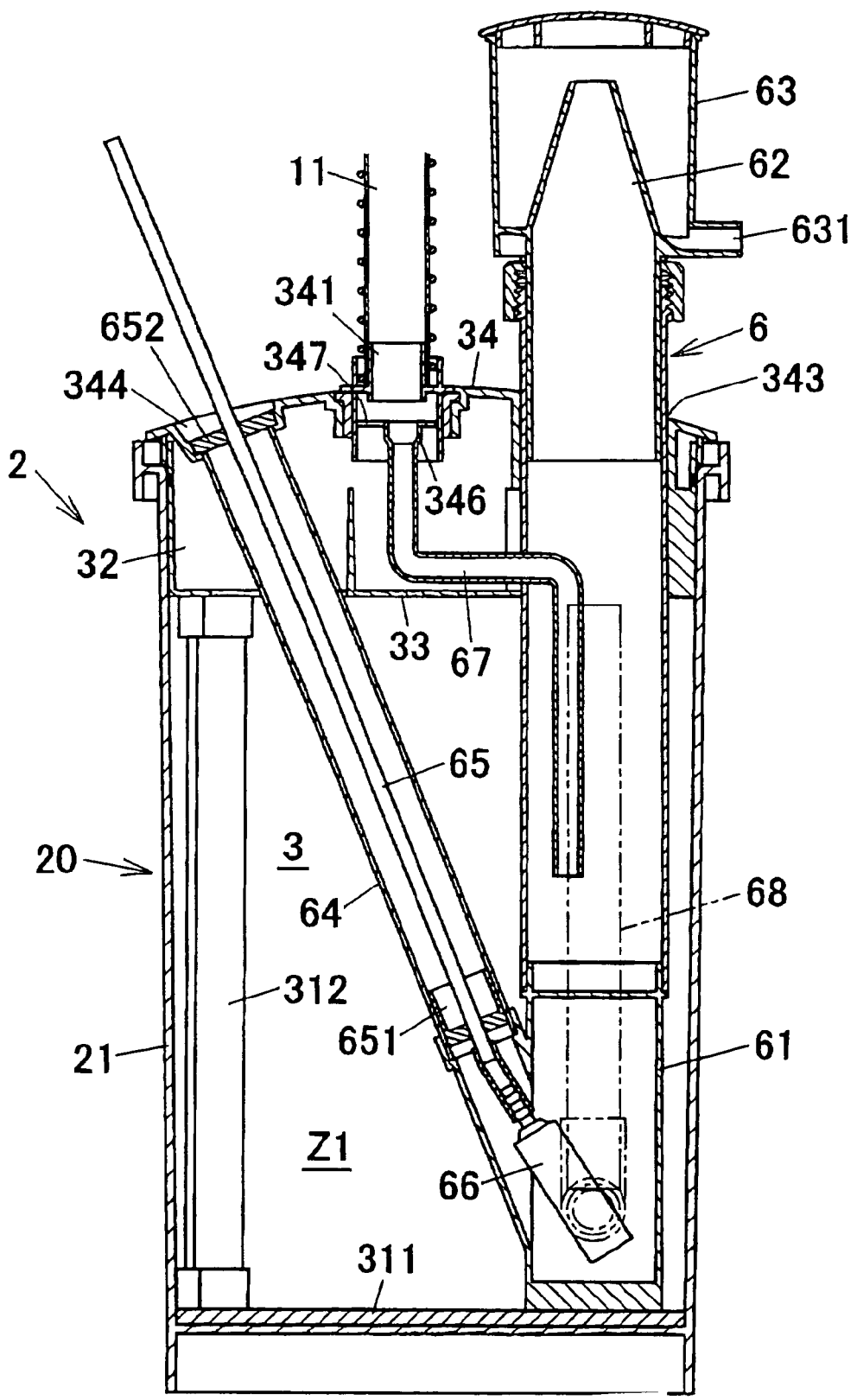
FIG. 6 is a front cross-sectional view of the filtering device of the embodiment.

As shown in FIG. 3, at the inlet side of the siphon pipe 55, the inlet side pipe portion is cut away in the middle of the height to thereby form a high inlet portion 551 as an air induction portion. This high inlet portion 551 is placed higher than the inlet side end portion of the siphon pipe 55 and also placed higher than the upper end of the overflow pipe 54 which will be described later. When the water level in the tank-inside water storage portion 51 is lowered due to any abnormal circumstances, the high inlet portion 551 appears above the water. This causes introduction of air into the siphon pipe 55 through the high inlet portion 551, resulting in interception of suction of water into the siphon pipe 55, which in turn forcibly stops supplying water W.

Furthermore, an air suction hole 555 is formed at the upper surface center of the siphon pipe 55 so that, at the time of initiating water supplying by the siphon pipe 55, the air in the siphon pipe 55 can be removed from the air suction hole 555 using, e.g., a suction tube 556. This air suction hole 555 is designed so that the suction state or the sealed state can be maintained after removing the air.

At the end portion of the lower wall of the tank-outside water storage portion 52, an inlet hose connection 521 is provided. Corresponding to this connection 521, an overflow pipe 54 having a specified height is also provided on the lower wall upper surface of the water storage portion 52.

The inlet side end portion of the inlet hose 11 made of a flexible hose is connected to the lower side of the inlet hose connection 521. The outlet side end portion of the inlet hose 11 is connected to the filtering device 2 as it will be explained later, and the water W flowing out of the overflow device 5 is introduced into the filtering device 2 via the inlet hose 11.

The tank-outside water storage portion 52 is provided with a sound insulating cover 57. This sound insulating cover 57 is formed into an above-water portion entirely covering type which covers the peripheral four sides and the upper surface of the region including the overflow pipe 54 above the water surface. Furthermore, the sound insulating cover 57 is provided with water flowing cutout portions 571 at the lower end of the peripheral side wall so that the water W stored in the tank-outside water storage portion 52 can flow into the sound insulating cover 57, i.e., the overflow pipe 54 side, via the water flowing cutout portions 571.

Air release holes 572 and 572 are formed in the upper wall of the sound insulating cover 57 so that the inside of the sound insulating cover 57 can be maintained to an atmosphere pressure by allowing the air to flow in and out of the sound insulating cover 57 via the air release holes 572.

At the other end portion of the lower wall of the tank-outside water storage portion 52, an outlet hose connection 532 is provided.

A discharge pipe 56 disposed in the overflow box 50 is formed into an inverted generally U-shape. The inlet side end portion of the discharge pipe 56 is communicated with the connection 523 of the tank-outside water storage portion 52. The middle bent portion is disposed along the bridge connection portion 53, and the outlet side end portion is communicated with the discharge nozzle 513 of the discharge opening 512 of the tank-inside water storage portion 51.

As shown in FIG. 3, at the upper end portion of the tank-inside pipe portion of the discharge pipe 56, a backflow preventing hole 561 is provided. As will be explained later, this backflow preventing hole 561 prevents the water W in the aquarium from flowing back to the side of the filtering device 2 from the side of the discharge pipe 56 in cases where the discharge pump 35 suddenly stops due to unexpected situations.

To the lower side of the outlet hose connection 523 of the overflow device 5, an outlet side end portion of the outlet hose 12 is connected. While, the inlet side end portion of the outlet hose 12 is connected to the filtering device 2 as will be explained later. The water W discharged from the filtering device 2 is introduced into the overflow device 5 via the outlet hose connection 523 via the outlet hose 12, and the water is then discharged into the aquarium from the discharge nozzle 513 via the discharge pipe 56.

The overflow device 5 is provided with height adjusting screws 531 and 531 on both sides of the bridge connection portion 53. The shaft tip end of each of the screws 531 and 531 is in contact with the upper end surface of the aquarium side wall via the contact frame 532. By adjusting the height of the overflow device 5 with respect to the aquarium 1 by changing the screwed amount of each of the screws 531 and 531, the water level in the overflow device 5 can be adjusted.

The overflow device 5 is provided with a perpendicular attitude control screw 535 on the lower surface of the tank-outside water storage portion 52 via the screw tube member 536. The head portion of the screw 535 is in contact with the outer surface of the aquarium side wall. Therefore, by adjusting the distance between the bottom portion of the tank-outside water storage portion 52 and the aquarium outer wall surface by changing the screwed amount of the screw 535, the horizontal attitude of the overflow device 5 can be adjusted.

<Filtering Device>

As shown in FIGS. 5 to 8, the filtering device 2 is equipped with a casing main body 21 having an opening at the upper end.

In this casing main body 21, the front portion constitutes a functional component zone Z1 and the rear side of the functional component zone Z1 constitutes a filtration zone Z2.

A functional component unit 3 is disposed in the functional component zone Z1 of the casing main body 21, and a filtration unit 4 is disposed in the filtration zone Z2.

On the side wall inner surfaces of the casing main body 21, guide protrusions 25 continuously extending vertically between the functional component zone Z1 and the filtration zone Z2.

Among the upper openings of the casing main body 21, the upper opening at the side of the functional component zone Z1 is covered with an upper wall member 34 of the functional component unit 3, and the upper opening at the side of the filtration zone Z2 is covered with a casing lid 22.

In this embodiment, the casing 20 is constituted by the casing main body 21, the casing lid 22 and the upper wall member 34 of the functional component unit 3.

<Functional Component Unit>

As shown in FIGS. 5 to 10, the functional component unit 3 includes a unit frame 31, a discharge pump 35, a protein skimmer 6, various connection members and various pipes.

The unit frame 31 is provided with a base plate 311 having a rectangular shape as seen from the top to be placed on the bottom surface of the casing main body 21, three vertical frames 312 upwardly extended from three corners of the base plate 311, and an inlet chamber 32 to be positioned at the upper side of the vertical frames 312.

Further, the inlet chamber 32 has an inlet chamber main body 33 supported by the upper ends of the vertical frames 312 and an upper wall member 34 detachably attached to the upper end opening portion of the inlet chamber main body 33.

The inlet chamber main body 33 is disposed so that the upper end open portion thereof corresponds to the upper end opening portion at the side of the functional component zone Z1 of the casing main body 21. Therefore, the upper wall member 34 closing the upper end opening portion of the inlet chamber main body 33 also functions as a lid member (a portion of the upper wall) of the casing main body 21.

The upper wall member 34 has an inlet hose connection 341, an outlet hose connection 342, a protein skimmer connection 343 and a stone replacement operation portion 344.

To the inlet hose connection 341, the outlet side end portion of the inlet hose 11 connected to the overflow device 5 is connected. While, to the outlet hose connection 342, the inlet side end portion of the outlet hose 11 connected to the overflow device 5 is connected.

Figure 11:
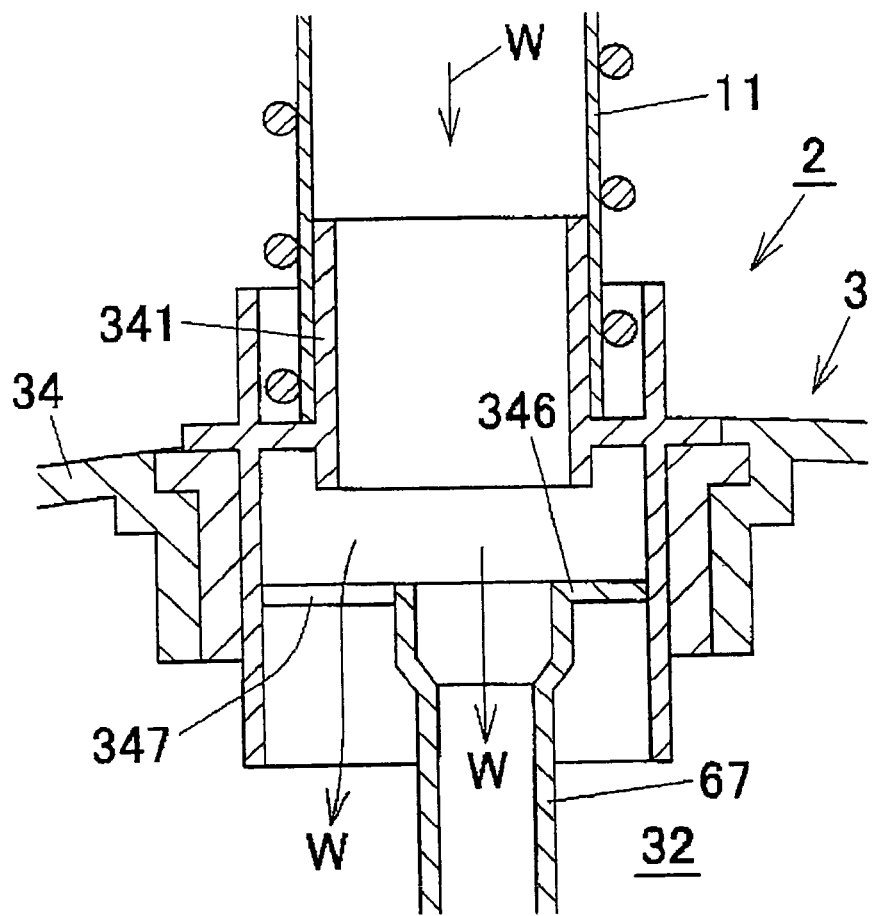
FIG. 11 is a front cross-sectional view of the flow dividing plate portion of the water introducing portion of the filtering device of the embodiment.

The inlet hose connection 341 has, at the lower surface side of the upper wall member 34, a flow dividing plate 346. As shown in FIG. 11, this flow dividing plate 346 has chamber communication holes 347 communicated with the inlet chamber 32, and is connected to the inlet side end portion of the protein skimmer connection pipe 67. Thus, among the water W introduced through the inlet hose 11, a part of the water W is introduced into the protein skimmer 6 via the protein skimmer connection pipe 67, while the rest of the water W is introduced into the inlet chamber 32 via the chamber communication holes 347.

In the rear wall of the inlet chamber main body 33, a filtration zone communication opening 331 communicated with the filtration zone Z2 is formed. The water W introduced into the inlet chamber 32 via the inlet hose connection 341 is introduced into the filtration zone Z2 through the filtration zone communication opening 331.

The discharge pump 35 is fixed to the upper surface of the base plate 311 of the unit frame 31. The outlet port of the discharge pump 35 is in fluid communication with the lower end of the discharge pipe 351. The upper end of this discharge pipe 351 is penetrated through the inlet chamber 32 and is in fluid communication with the discharge hose connection 342 of the upper wall member 34. Thus, the water W stored in the bottom portion of the casing main body 21 is fed to the discharge pipe 351 by the discharge pump 35, and the water W passes through the outlet hose 12 and is supplied to the overflow device 5.

The protein skimmer 6 has a vertically disposed protein skimmer main pipe 61 with the lower end fixed to the base plate 311 of the unit frame 31. The upper end of the skimmer main pipe 61 penetrates the inlet chamber 32 and is disposed above the upper part of the upper wall member 34.

Within the upper end portion of the skimmer main pipe 61, a tapered pipe 62 with a radius gradually decreasing towards the upper portion thereof is provided. Further provided is a protein skimmer cup 63 covering the upper tapered portion of the tapered pipe 62. This protein skimmer cup 63 is provided with a discharge spout 631 for discharging organic contaminants, such as, e.g., protein, accumulated in the cup, which will be detailed later.

The protein skimmer connection pipe 67 penetrates in the upper portion of the skimmer main pipe 61, so that a part of the water W divided by the flow dividing plate 346 in the chamber upper wall member 34 is introduced into the skimmer main pipe 61 of the protein skimmer 6 via the connection pipe 67.

In the protein skimmer 6, the lower end of the inclined pipe 64 is fluidly connected to the lower end portion of the skimmer main pipe 61. The inclined pipe 64 is placed so that it extends obliquely upward from the lower end portion of the skimmer main pipe 61. The upper end of the inclined pipe 64 penetrates the inlet chamber 32 and is connected to the stone replacement operation portion 344 of the upper wall member 34.

The inclined pipe 64 is provided with blocking members 651 and 652 fitted and attached to the upper end and the lower end of the inclined pipe 64. Also, in the inclined pipe 64, a hard air supplying pipe 65 is disposed in a state in which the pipe penetrates both the blocking members 651 and 652. The tip end of the air supplying pipe 65 is placed at the lower end portion of the skimmer main pipe 61.

A wood stone 66 as a bubble generating means is placed at the lower end portion of the skimmer main pipe 61, and the wood stone 66 is communicated with the tip end of the air supplying pipe 65. The wood stone 66 is formed into an elongated cylindrical shape with a diameter smaller than the inner diameter of the inclined pipe 64 so that it can be inserted in the inclined pipe 64. Therefore, by pulling out the air supplying pipe 65 from the inclined pipe 64, the wood stone 66 can be taken out from the skimmer main pipe 61 together with the air supplying pipe 65 via the inclined pipe 64. On the other hand, by inserting the air supplying pipe 65 into the inclined pipe 64 from the upper end portion together with the wood stone 66 attached to the tip end of the air supplying pipe 65, the wood stone 66 can be placed at a predetermined position in the lower portion of the skimmer main pipe 61.

In this way, the wood stone 66 can be taken in and out without troublesome operations, such as, disassembling operations of the other components.

The wood stone 66 has a number of fine pores, and can generate a number of bubbles by supplying air to the wood stone 66 via the air supplying pipe 65 in a state in which the wood stone 66 is immersed in the stored water W in the skimmer main pipe 61. Organic contaminants, such as, e.g., protein, contained in the water adhere to the generated bubbles, and they move upwards. The upwardly moved proteins further go up through the skimmer main pipe 61 to be discharged from the upper end of the tapered pipe 62, collected within the protein skimmer cup 63, and then discharged to the outside via the discharge spout 631.

At the peripheral wall lower end of the skimmer main pipe 61 of the protein skimmer 6, the lower end of the overflow pipe 68 is connected. While, the upper end of the overflow pipe 68 is disposed at the lower portion of the inlet chamber 38 of the filtration zone Z1. Thus, when the water W supplied to the skimmer main pipe 61 is stored more than the specified amount, the water W is discharged to the inside of the casing 20 but outside the protein skimmer 6 via the overflow pipe 68.

In the functional component unit 3 having the abovementioned structure, the inlet chamber 32 and the base plate 311 are each formed to have a plane shape corresponding to the plane cross-section of the functional component zone Z1 of the casing main body 21. In the state in which the functional component unit 3 is assembled, the unit 3 can be inserted into and removed from the functional component zone Z1 of the casing main body 21 via the upper end opening thereof. Furthermore, at the time of the insertion/removal operation thereof, the rear ends of both side portions of the inlet chamber 32 and those of the base plate 311 of the unit are engaged with and guided by the guide protrusions 25 formed on the inner side surfaces of the casing main body 21, so that the insertion/removal operation of the unit 3 can be performed smoothly. Furthermore, in a state in which the unit 3 is accommodated, the rear ends of both side portions of the inlet chamber 32 and those of the base plate 311 are engaged with the guide protrusions 25 to be positioned, so that the entire unit 3 is disposed within the casing main body 21 in a fitted manner.

In this embodiment, despite whether the filtration unit 4, which will be mentioned later, is accommodated within the casing main body 21, the functional component unit 3 can be inserted and removed from the casing main body 21.

<Filtration Unit>

Figure 7:
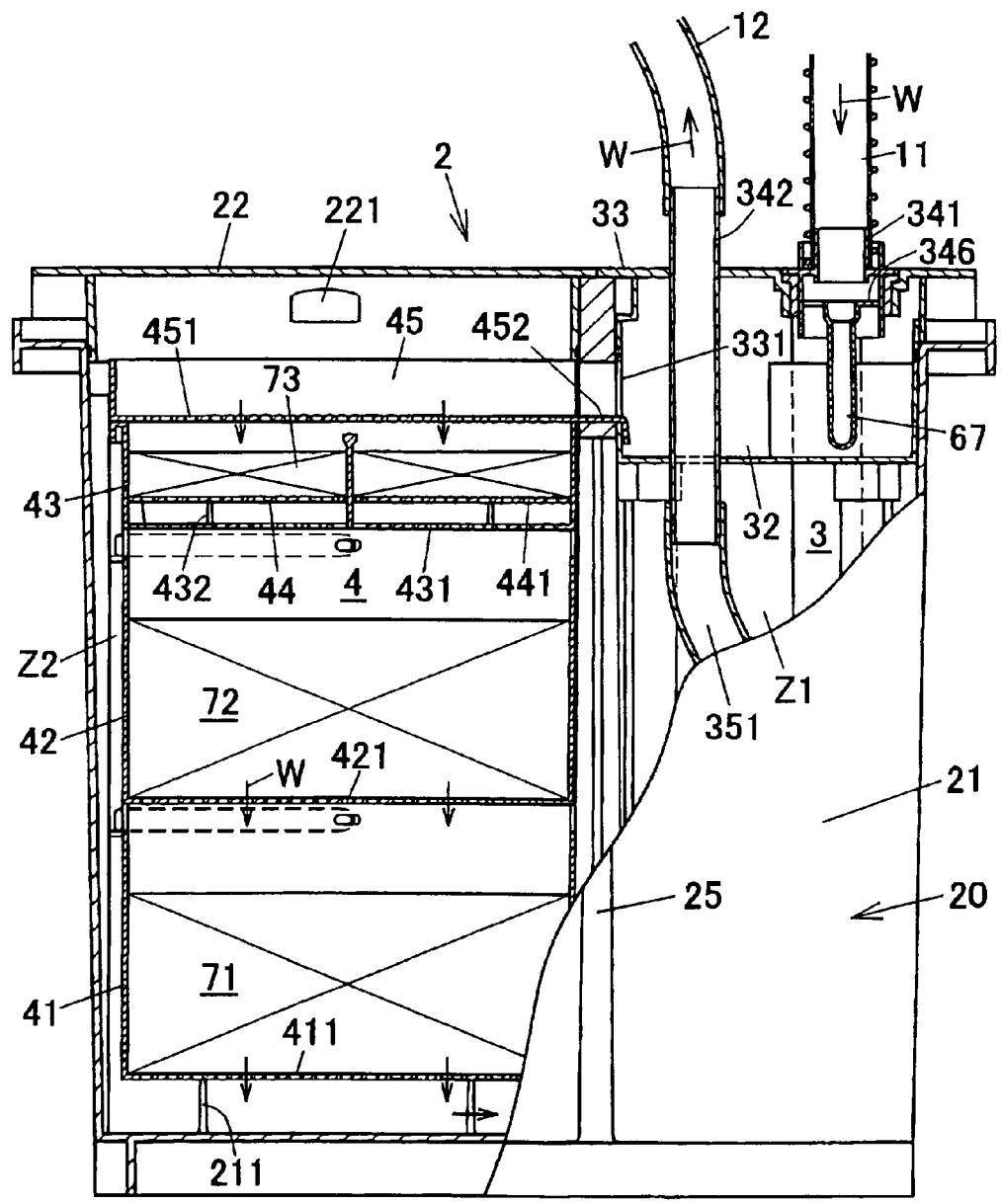
FIG. 7 is a side cross-sectional view of the filtering device of the embodiment.
Figure 8:
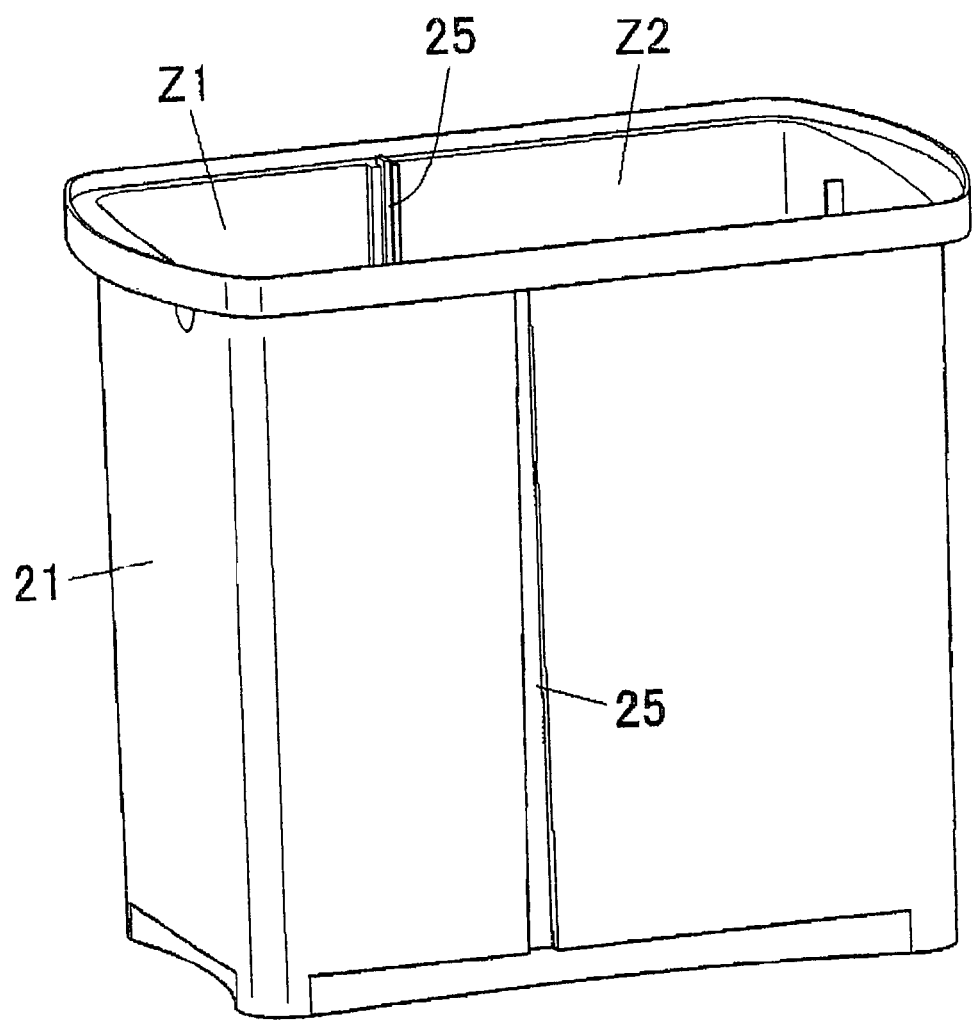
FIG. 8 is a perspective view of a casing main body of the filtering device of the embodiment.
Figure 9:
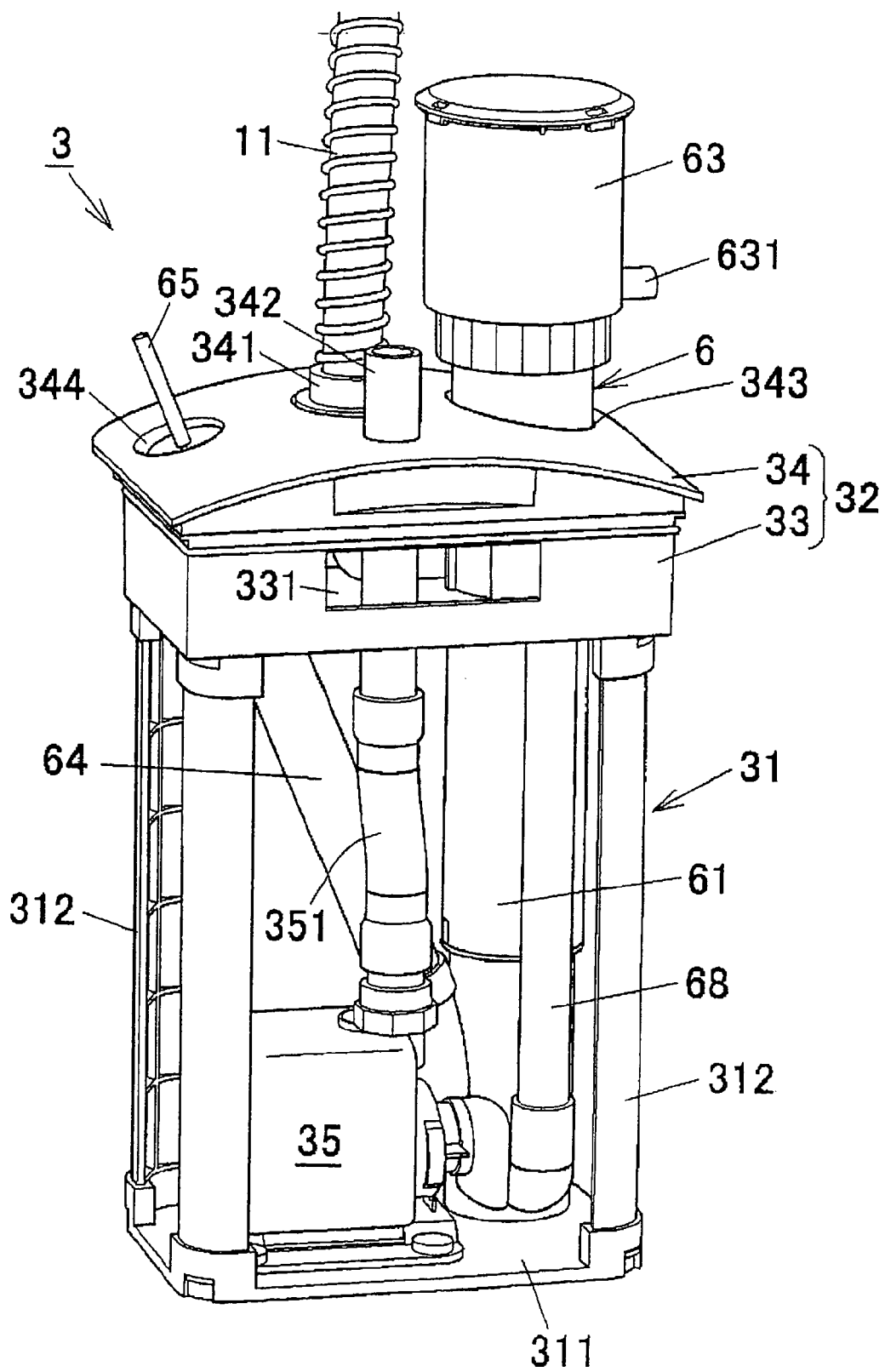
FIG. 9 is a perspective view showing the functional component unit applied to the filtering device of the embodiment.
Figure 10:
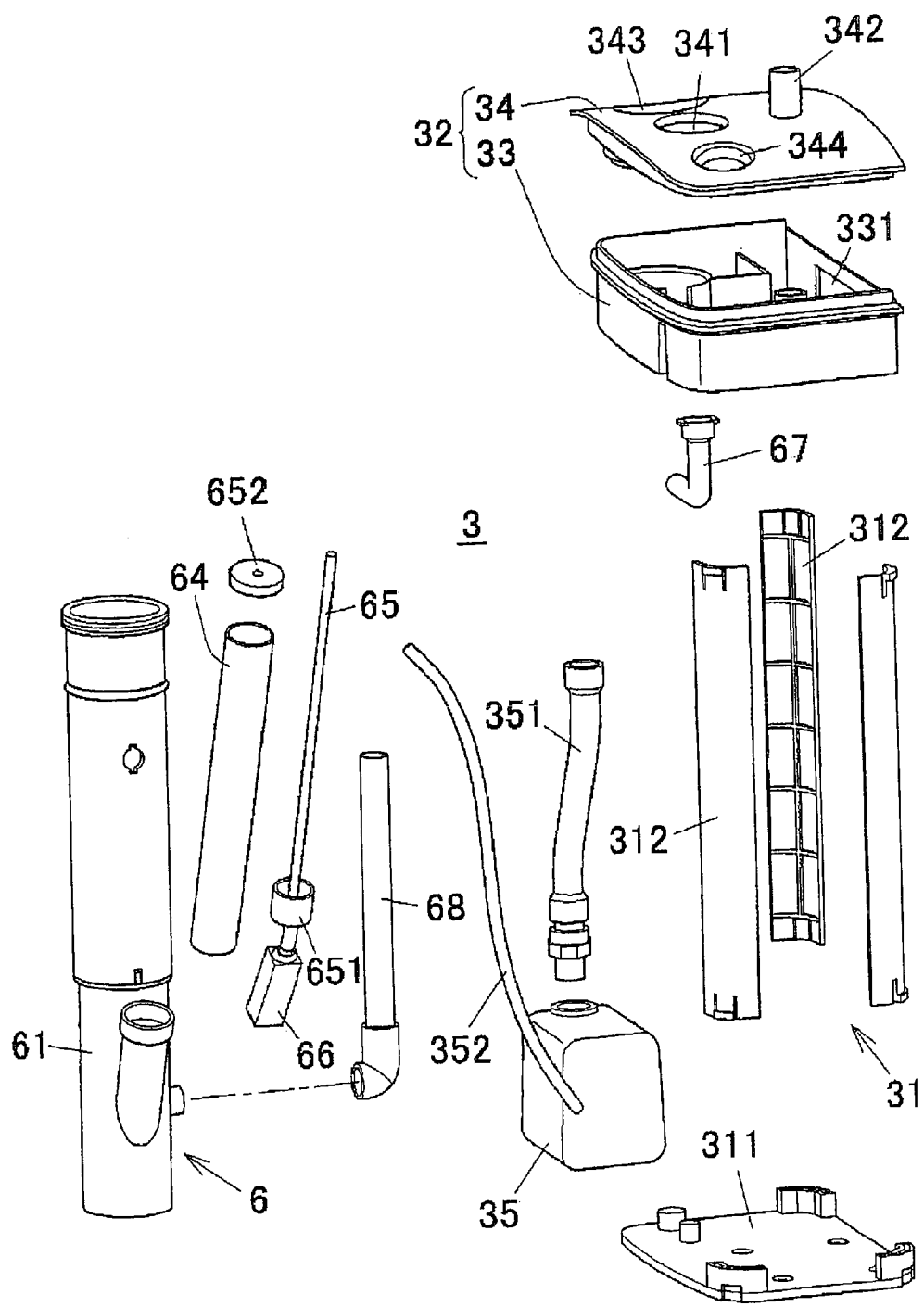
FIG. 10 is an exploded perspective view of the functional component unit of the filtering device of the embodiment.
Figure 12:
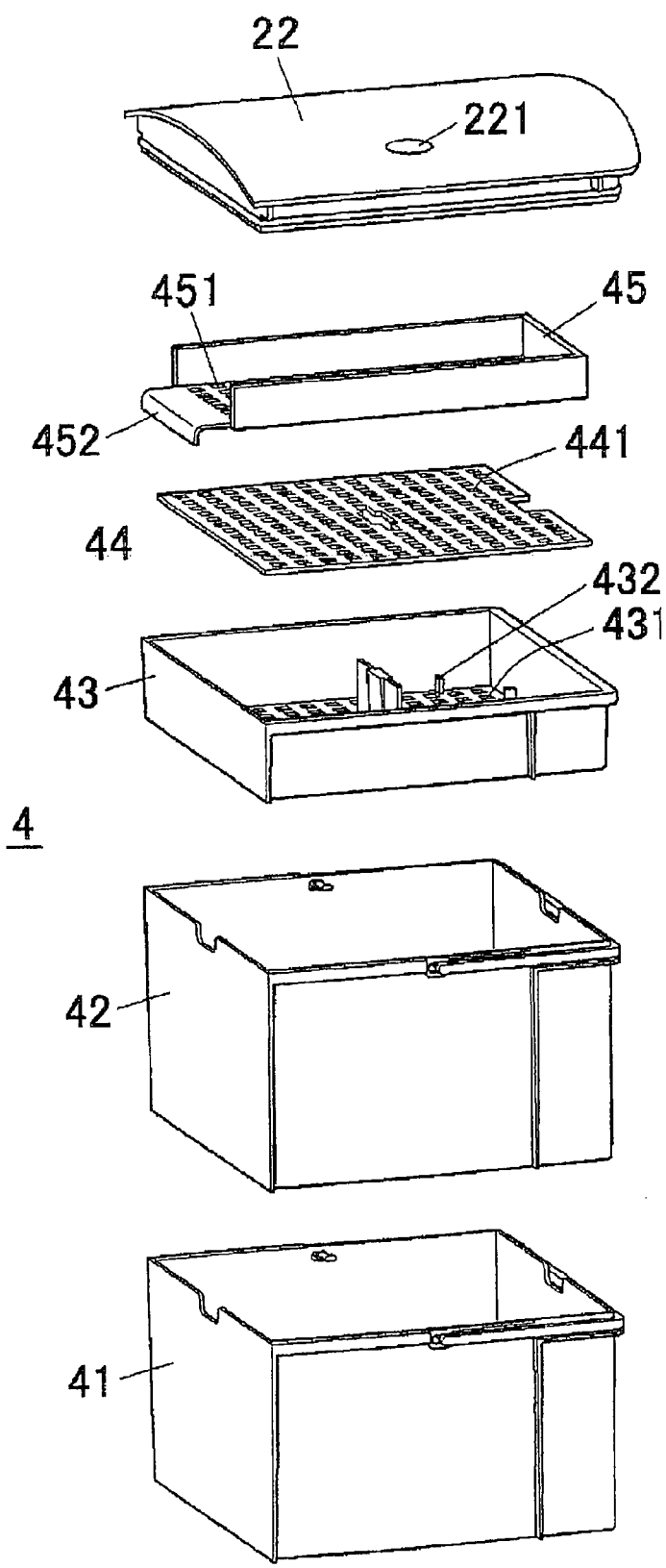
FIG. 12 is an exploded perspective view of the filtering unit of the filtering device of the embodiment.

As shown in FIGS. 7 and 12, the filtration unit 4 includes a lower bucket 41, a middle bucket 42, a water spray tray 43, a drain board 44 and a gutter member 45.

Each of the buckets 41 and 42 is formed into an upper opened box shape and is provided with a number of water spraying holes 411 and 421 formed in the bottom wall, so that the water W supplied to the inside of the buckets 41 and 42 are poured out downward through the water spraying holes 411 and 421.

At the side of the filtration zone Z2, spacer protrusions 211 for placing the lower bucket 41 thereon are formed on the bottom surface of the casing main body 21. Thus, the lower bucket 41 is accommodated in the filtration zone Z2 of the casing main body 21 with a substantial space formed between the bottom surface of the filtration zone Z2 and the bottom surface of the lower bucket 41.

Furthermore, the middle bucket 42 is accommodated in the filtration zone Z2 of the casing main body 21 with the middle bucket placed on the lower bucket 41.

The water spray tray 43 is formed into an upper opened shallow box shape and has a number of water spraying holes 431 formed in the bottom wall thereof. Also, the water spray tray 43 is provided with spacer protrusions 432 formed on the bottom surface thereof.

The water spray tray 43 is accommodated in the filtration zone Z2 of the casing main body 21 with the water spray tray placed on the middle bucket 42.

The drain board 44 is formed into a shape corresponding to the inner circumferential shape of the water spray tray 43, and has a number of water spraying holes 441.

This drain board 44 is placed on the spacer protrusions 432 of the water spray tray 43. Thus, the drain board 44 is accommodated in the water spray tray 43 in a fitted manner with a substantial space formed between the drain board and the bottom of the water spray tray 43.

The gutter member 45 is formed into an upper opened channel shape and has a number of water spraying holes 451 formed in the bottom wall. The front end (the end portion at the functional component zone side) of the gutter member 45 is opened, while the rear end is closed.

The gutter member 45 is disposed on the water spray tray 43 via the drain board 44 so that the front opened end portion faces the filtration zone communication opening 331 of the inlet chamber 32 of the functional component unit 3.

The gutter member 45 is provided with a water guiding tongue portion 452 forwardly extended from the bottom wall front end thereof. This tongue portion 452 is inserted into the filtration zone communication opening 331 and engaged with the inlet chamber 32 of the functional component unit 3. Consequently, the stored water W in the inlet chamber 32 is guided by the tongue portion 452 and supplied smoothly to the gutter member 45 via the communication opening 331.

In the filtration unit 4 constructed as explained above, it is configured such that each of the constituent components 41 to 45 can be inserted into and detached from the upper end opening of the filtration zone Z2 of the casing main body 21.

The buckets 41 and 42 and the water spray tray 43 are each formed into a shape corresponding to the plane cross-sectional shape of the filtration zone Z2. Therefore, when these members 41, 42 and 43 are insert into or detached from the filtration zone Z2 of the casing main body 21, front both side portions of the buckets 41 and 42 and those of the water spray tray 43 are engaged with and guided by the guiding protrusions 25 formed on the inner side surfaces of the casing 21, so that insertion/removal operation of each of the members 41 to 45 can be performed with high dimensional accuracy. In a state in which the members 41 to 45 are accommodated, front both side portions of the buckets 41 and 42 and those of the water spray tray 43 are engaged with the guide protrusions 25 in a positioned manner, so that each of the members 41 to 45 is accommodated in the casing main body 21 in a fitted manner.

Furthermore, in this embodiment, despite whether the functional component unit 3 is accommodated in the casing main body 21, it is constituted such that each of the components 41 to 45 of the filtration unit 4 can be inserted into or detached from the casing main body 21.

To the upper end opening of the filtration zone Z2 of the casing main body 21, the aforementioned casing lid 22 is detachably attached via a packing (not shown).

As mentioned above, the casing 20 is constituted by attaching the casing lit 22 and the upper wall member 34 of the functional component unit 3 to the casing main body 21. However, the interior of the casing 20 is open to the atmosphere. For example, the casing lid 22 has an atmospheric communication opening 221, so that air is allowed to go into and out of the casing 20 via the communication opening 221. Thus, the interior of the casing 20 is open to the atmosphere.

In FIG. 1, the reference numeral "352" denotes a power cord of the discharge pump 35, the reference numeral "655" denotes an air supplying means for supplying air to the wood stone 66 via the air supplying pipe 65.

<Operation of the Aquarium System>

In the abovementioned aquarium system, the following operation preparation is performed before the actual operation.

In preparing the operation, as shown in FIG. 7, the filtration materials 71 to 73 are initially set to the filtering device 2. In the lower bucket 41 of the filtration unit 4, a filtration material 71, such as, e.g., Siporax, in which anaerobic filtering bacteria can be grown, is accommodated to perform biofiltration. In the middle bucket 42, a filtration material 72, such as, e.g., bio ball, in which aerobic filtration bacteria can be grown, is accommodated to perform biofiltration. Furthermore, in the water spray tray 43, a filtration material 73, such as, e.g., wool or activated carbon, is accommodated via the drain board 44 to perform physical filtration.

Further, as explained above, the overflow device 5 is set so as to straddle the side wall upper end of the aquarium 1. In this state, the tank-inside water storage portion 51 of the overflow device 5 is immersed in the water W in the aquarium to a predetermined level, so that the water W in the aquarium flows into the storage portion 51 via the water passage holes 511. Thus, a specified amount of water is stored in the tank-inside water storage portion 51.

Also accommodated in the tank-inside water storage portion 51 of the overflow device 5 is a physical filtration material (not shown), such as, e.g., sponge.

Furthermore, hoses 11 and 12 are set between the filtering device 2 and the overflow device 5. In detail, the inlet side end portion of the inlet hose 11 is fluidly connected to the inlet hose connection 521 of the overflow device 5, while the outlet side end portion thereof is fluidly connected to the inlet hose connection 341 of the filtering device 2. Also, the inlet side end portion of the outlet hose 12 is fluidly connected to the outlet hose connection 342 of the filtering device 2, while the outlet side end portion thereof is fluidly connected to the outlet hose connection 523 of the overflow device 5.

Next, in the tank-outside water storage portion 52 of the overflow device 5 set on the aquarium side wall, water W is filled to a level slightly lower than the water level of the tank-inside water storage portion 51. Then, after completely extracting air from the inside of the siphon pipe 55 via the suction tube 556 from the air suction hole 555 of the siphon pipe 55, the air suction hole 555 is kept in a suctioning state or in a sealed state. With this, the siphon pipe 55 is filled with water W, and, by the siphon phenomenon, a small amount of water W is supplied to the tank-outside water storage portion 52 from the tank-inside water storage portion 51 through the siphon pipe 55. When the water levels of both the water storage portions 51 and 52 become equal, the supplying of water W is stopped.

Furthermore, the sound insulating cover 57 is set to the tank-outside water storage portion 52 so as to surround the entire periphery of the overflow pipe 54.

Next, a specified amount of water W is poured into the casing 20 of the filtering device 2. At that time, the water W is stored to the level where the lower bucket 41 containing the anaerobic bacteria filtration material 71 in the casing 20 is submerged underwater. In order to supply water W to the casing 20, it is only required to supply water in the aquarium 1. That is, by pouring water W in the aquarium 1, the water level of the aquarium 1 increases. In accordance with the rise in water level, the water is supplied to the tank-outside water storage portion 52 from the tank-inside water storage portion 51 through the siphon pipe 55 in the overflow device 5. When the water W is further supplied and the water level in the tank-inside water storage portion 51 further rises, the water W is introduced into the overflow pipe 54 from its upper end opening and supplied to the casing 20 of the filtering device 2 via the inlet hose 11. In this way, the water W can be supplied to the filtering device 2 by supplying water to the aquarium 1.

After completion of the operation preparation, the operation of the aquarium system is initiated. That is, the discharge pump 35 of the filtering device 2 is activated, and air is supplied to the wood stone 66 of the protein skimmer 6.

With this, in the casing 20 of the filtering device 2, water W is fed to the discharge pipe 351 by the discharge pump 35, and the water W is fed to the discharge pipe 56 of the overflow device 5 through the outlet hose 12. The water W fed to the discharge pipe 56 is discharged to the aquarium 1 from the discharge nozzle 513.

When the water W is supplied to the aquarium 1 and the water level of the aquarium 1 rises, the water level of the tank-inside water storage portion 51 of the overflow device 5 rises in accordance with the rise in water level of the aquarium 1. Then, the water W in the aquarium is supplied to the tank-outside water storage portion 52 through the siphon pipe 55 from the tank-inside water storage portion 51. Furthermore, the water W flows into the overflow pipe 54 and is supplied to the casing 20 of the filtering device 2 through the inlet hose 11.

The water W fed to the casing 20 is divided by the flow dividing plate 346 at the inlet hose connection 341, and most of the water W is introduced into the inlet chamber 32 through the chamber communication holes 347, and the remaining water W is introduced into the skimmer main pipe 61 of the protein skimmer 6 through the protein skimmer connection pipe 67.

Protein contained in the water W introduced into the protein skimmer 6 is removed. That is, a wood stone 66 is disposed in the water introduced into and stored in the skimmer main pipe 61, and a number of bubbles are generated from the wood stone 66. The protein in the water adheres to these bubbles, floats, sequentially moves upwards, and gradually goes upward through the skimmer main pipe 61. These ascended bubbles with protein are discharged from the upper end of the tapered pipe 62, collected in the protein skimmer cup 63 and discharged to the outside from the discharge spout 631. Thus, only protein is discharged and removed from the water.

The water W from which protein is removed goes through the overflow pipe 68 of the protein skimmer 6 and discharged outside the protein skimmer 6 but inside the casing 20.

On the other hand, the water W introduced into the inlet chamber 32 is supplied to the gutter member 45 of the filtration zone Z2 through the filtration zone communication opening 331.

While flowing the gutter member 45, the water supplied to the gutter member 45 is dispersed and drops through a number of water spraying holes 451, and is supplied to nearly the entire area of the filtration material 73 of the water spray tray 43 in a dispersed manner.

After physically filtered by the filtration material 73, the water W supplied to the filtration material 73, such as, e.g., wool or activated carbon, passes through the drain board 44, and is dispersed and drops through a number of water spraying holes 431 of the water spray tray 43 and then supplied to nearly the entire area of the filtration material 72 of the middle bucket 42.

The water W supplied to the filtration material 72, such as, e.g., a bio ball, in the middle bucket 42 is biologically filtered by the aerobic filter bacteria attached to the filtration material 72, and then dispersed and drops through a number of water spraying holes 421 and supplied to nearly the entire area of the filtration material 71 of the lower bucket 41.

The water W supplied to the filtration material 71, such as, e.g., Siporax, in the lower bucket 41 is biologically filtered by the anaerobic filter bacteria attached to the filtration material 71, and supplied to the bottom portion of the casing 20 through a number of water spraying holes 511.

The water W filtered as mentioned above flows from the filtration zone Z2 to the functional component zone Z1, and is fed to the discharge pipe 351 by the discharge pump 35 and then supplied to the aquarium 1 in the same manner as mentioned above.

In this way, the water W consecutively circulates between the aquarium 1 and the filtering device 5, and the water W in the aquarium 1 is filtered by the filtering device 5 to be always kept clean.

<Effects of the Embodiment>

In the aquarium system of the abovementioned embodiment, even if the water pump 35 suddenly stops due to unforeseen situations, such as, e.g., electric power failure, it is prevented that the water W in the aquarium flows backward through the outlet hose 12 to be fed to the filtering device 2. When the water supply to the outlet hose 12 by the discharge pump 35 stops, the water W in the outlet hose 12 flows backward toward the filtering device 2, which in turn causes suction of the water W in the aquarium into the inverse U-shaped discharge pipe 56 of the overflow device 5 and starts to backflow. In the present embodiment, however, the backflow preventing hole 561 formed in the upper end portion of the tank-inside pipe portion of the discharge pipe 56 causes introduction of air into the discharge pipe 56 via the backflow preventing hole 561 when the water W in the discharge pipe 56 starts to flow backward. This prevents suction of the water in the aquarium into the discharge pipe 56, which in turn prevents the water in the aquarium from flowing back to the filtering device 2. If there is no backflow preventing hole 561, when the discharge pump 35 stops, the water in the outlet hose 12 starts to flow backwards. Simultaneously with the backflow of the water, the water W in the aquarium is sucked into the discharge pipe 56 due to the siphon phenomenon, resulting in backflow of the water to the filtering device 2.

Immediately after the pump 35 stops, the water W in the aquarium is sucked from the siphon pipe 55 of the overflow device 5 and supplied to the filtering device 2 through the inlet hose 11, but the water supply from the filtering device 2 to the aquarium stops, so the water level of the aquarium gradually lowers. In this embodiment, since the inlet side pipe portion of the siphon pipe 55 is partially cutout to provide a high inlet portion 551, when the water level in the aquarium is decreased, the high inlet portion 51 appears above the water to cause introduction of air from the high inlet portion 551 into the siphon pipe 55, resulting in prevention of the water suction into the siphon pipe 55. Therefore, even if the pump stops, the supply of the water W by the siphon pipe 55 is interrupted immediately.

As will be understood from the above, in this embodiment, even if the discharge pump 35 stops due to unforeseen circumstances, the backflow of the water W in the aquarium to the outlet hose 12 can be prevented, and at the same time, the supply of the water W from the siphon pipe 55 can be automatically interrupted without delay. Therefore, troubles, e.g., water leakage, due to the backflow of the water or the excessive supply of the water, can be prevented, and the performance dependability can be further improved.

In the filtering device 2 of this embodiment, the casing 20 is clearly divided into the functional component zone Z1 and the filtration zone Z2 and the functional component unit 3 is detachably accommodated in the functional component zone Z1. Therefore, the functional component unit 3 can be easily detached, so that the maintenance and repair of the pump 35 and/or the protein skimmer 6 constituting the unit 3 can be easily performed. Furthermore, the functional component unit 3 includes the pump power cord and various pipes as well as the inlet hose connection 341, the outlet hose connection 342, the protein skimmer connection 343, and the stone replacement operation portion 344, so these components and members could also be easily maintained.

Among other things, the discharge pump 35 can be easily deteriorated or damaged as compared to other components. However, since the pump 35 can be easily maintained, the usability of the filtering device 2 can be dramatically improved.

In addition to the above, in the filtering device 2 of this embodiment, the wood stone 66 of the protein skimmer 6 can be easily replaced. That is, the upper end portion of the inclined pipe 64 connected to the lower end portion of the skimmer main pipe 61 is opened at the upper surface of the upper wall member 34 of the functional component unit 3, and the wood stone 66 with the air supply pipe 65 is inserted from the upper end opening portion of the inclined pipe 64 and placed at the specified position of the skimmer main pipe 61. Therefore, by pulling out the air supplying pipe 64 from the upper end opening portion of the inclined pipe 64, the wood stone 66 can be detached together with the air supplying pipe 65. In this manner, the wood stone 66 can be easily detached and replaced with new one without removing the skimmer main pipe 61 and/or disassembling the other components. Especially, in the case of the wood stone 66, although the exchanging timing is short due to clogging, the replacement of the wood stone 66 can be made easily. This further improves the usability of the filtering device 2.

Furthermore, in the filtering device 2 of this embodiment, the casing 20 is provided with the inlet chamber 32 to once store the water W from the aquarium 1 therein and supply the water W from this chamber 32 to the filtration zone Z2. This enables stable supply of water W to the filtration zone Z2, which in turn can improve the filtration capability.

Furthermore, in the filtering device 2 of this embodiment, the inside of the casing 20 is open to the atmosphere and the upper portion of the casing 20 is in contact with air. Thus, filtering by aerobic filtering bacteria can be performed, which further improves the filtering capability.

Furthermore, in the filtering device 2 of this embodiment, as the filtration materials 71, 72 and 73, filtering of different types is sequentially performed using wool or activated carbon for physical filtering, the bio ball for aerobic bacterial filtering, and Siporax for anaerobic bacterial filtering. Thus, the water W of the aquarium can be filtered assuredly and kept clean by the dry and wet method, which can keep the aquarium in the optimal environment for aquarium fish and the like.

In addition, in the filtering device 2 of this embodiment, different types of filtration materials 71, 72, and 73 are stacked to form the filtration zone Z2 to cause the water W to pass through each of the filtration materials 71, 72 and 73 sequentially from the upper one. Therefore, it is possible to assuredly pass the water W through each of the filtration materials 71, 72 and 73 by gravity fall to thereby improve the filtering capability more assuredly.

Also, in the overflow device 5 of the aquarium system of this embodiment, it is possible to avoid adverse effects to the peripheral environment caused by the suction sound occurring when the water W is suctioned from the overflow pipe 54. In a normal overflow pipe 54, water and air are irregularly suctioned when the water W is suctioned from the upper end of the overflow pipe, generating the suction sound of air. In contrast, according to the overflow device 5 of this embodiment, since the sound insulating cover 57 is mounted in the tank-outside water storage portion 52 so that the sound insulating cover 57 covers all of the four peripheral side surfaces and the upper surface of the above-water area of the periphery of the overflow pipe 54. Therefore, even if the overflow pipe 54 generates suction sound, the suction sound is intercepted by the sound insulating cover 57 and the suction sound is trapped in the cover 57. In this way, the suction sound is intercepted and prevented from spreading outside, so there are no adverse effects of the suction sound to the peripheral environment, and troubles caused by the suction sound can be assuredly prevented.

In the aforementioned embodiment, although the explanation was directed to the case in which the functional component unit 3 of the aquarium filtering device 2 includes the discharge pump 35 and the protein skimmer 6, the present invention is not limited to it. In the present invention, it is not required that the functional component unit 3 includes the protein skimmer. Furthermore, the functional component unit 3 can include a heater, an air blower, a cooler or the like, for adjusting the water temperature.

In the overflow device 5 of the abovementioned embodiment, the tank-inside water storage portion 51 is provided in the aquarium 1, and the water W in the aquarium is supplied to the tank-outside water storage portion 52 via the siphon pipe 55, but the present invention is not limited to that. In the present invention, it is not always required to provide the tank-inside water storage portion. The inlet side end portion of the siphon pipe can be placed directly in the aquarium.

Also, in the abovementioned embodiment, although the explanation was directed to the case in which the present invention is applied to the overflow device in which the overflow pipe 54 is provided in the tank-outside water storage portion 52, the present invention is not limited to it. The present invention can also be applied to an overflow device in which water W discharged from a filtration device is once stored in a water storage portion provided in the aquarium and then the water W is supplied from the water storage portion to the aquarium via an overflow pipe.

Furthermore, in the aforementioned embodiment, the air inlet portion is constituted by the high level inlet portion 551 formed by cutting out the inlet side pipe of the siphon pipe 55 in the middle of the height. However, the present invention is not limited to it. In the present invention, any means can be employed so long that the air inlet portion is formed at the inlet side pipe portion and can introduce air. For example, the air inlet portion can be constituted by an opening (hole) formed in the middle of the inlet side pipe of the siphon pipe.

This application claims priority to Japanese Patent Application No. 2006-79517 filed on Mar. 22, 2006, the entire disclosure of which is incorporated herein by reference in its entirety.

It should be understood that the terms and expressions used herein are used for explanation and have no intention to be used to construe in a limited manner, and allow various modifications falling within the claimed scope of the present invention.

Industrial Applicability

The aquarium overflow device according to the present invention can be used for an aquarium equipment for supplying water in an aquarium for aquarium fish, etc., to an external device, such as, e.g., a filtering device.

The invention claimed is:

1. An aquarium overflow device for supplying water in an aquarium to an external device, the overflow device comprising:
   (a) an inverted U-shaped siphon pipe for supplying the water in the aquarium to an outside of the aquarium, the siphon pipe having an inlet side end portion to be disposed in the aquarium and an outlet side end portion to be disposed outside the aquarium,
   wherein the siphon pipe has an air inlet portion formed at an inlet side pipe portion of the siphon pipe so as to be located above the inlet side end portion,
   whereby, when a water level in the aquarium drops below the air inlet portion, air is introduced into the siphon pipe via the air inlet portion to thereby prevent water from being suctioned into the siphon pipe, and
   (b) an inverted U-shaped discharge pipe having an inlet side end portion to be disposed outside the aquarium and an outlet side end portion to be disposed inside the aquarium,
   wherein water forcibly supplied from an external device is introduced into the discharge pipe from the inlet side end portion and then discharged to the aquarium from the outlet side end portion,
   wherein the discharge pipe is provided with a backflow preventing hole at an upper portion thereof, and
   wherein, when forcible water supply from the external device is stopped, air is introduced into the discharge pipe from the backflow preventing hole to thereby prevent backflow of the water.

2. The aquarium overflow device as recited in claim 1, wherein the air inlet portion is formed by cutting out the inlet side portion of the siphon pipe.

3. The aquarium overflow device as recited in claim 1, further comprising a tank-outside water storing portion to be disposed along a side wall external surface of the aquarium, wherein the outlet side end portion of the siphon pipe is disposed in the tank-outside water storing portion so that the water in the aquarium is once stored in the tank-outside water storing portion and then supplied to an outside of the aquarium.

4. The aquarium overflow device as recited in claim 1, further comprising a tank-inside water storing portion which is to be disposed along a side wall inner surface of the aquarium and configured to introduce the water in the aquarium therein, wherein the inlet side end portion of the siphon pipe is disposed in the tank-inside water storing portion.

* * * * *

UNITED STATES PATENT AND TRADEMARK OFFICE
CERTIFICATE OF CORRECTION

| | | |
|---|---|---|
| PATENT NO. | : 8,132,533 B2 | Page 1 of 1 |
| APPLICATION NO. | : 12/225401 | |
| DATED | : March 13, 2012 | |
| INVENTOR(S) | : Arita et al. | |

It is certified that error appears in the above-identified patent and that said Letters Patent is hereby corrected as shown below:

On the Title Page

Item [22], please change "Sep. 30, 2006" to correctly read:
--Aug 30, 2006--.

Signed and Sealed this
Seventeenth Day of April, 2012

David J. Kappos
*Director of the United States Patent and Trademark Office*